United States Patent
Matsuura (10) Patent No.: US 7,693,166 B2
(45) Date of Patent: Apr. 6, 2010

(54) METHOD AND APPARATUS FOR TRANSMITTING DATA TO NETWORK AND METHOD AND APPARATUS FOR RECEIVING DATA FROM NETWORK

(75) Inventor: Masatsugu Matsuura, Tokyo (JP)

(73) Assignee: NEC Corporation, Tokyo (JP)

( * ) Notice: Subject to any disclaimer, the term of this patent is extended or adjusted under 35 U.S.C. 154(b) by 731 days.

(21) Appl. No.: 11/354,904

(22) Filed: Feb. 16, 2006

(65) Prior Publication Data

US 2006/0181734 A1 Aug. 17, 2006

(30) Foreign Application Priority Data

Feb. 17, 2005 (JP) .............................. 2005-040725

(51) Int. Cl.
*H04L 12/56* (2006.01)
(52) U.S. Cl. .................... 370/412; 370/351; 370/389
(58) Field of Classification Search ................. 370/351, 370/389, 412, 413, 415, 417, 418; 710/1, 710/52–54, 55, 56
See application file for complete search history.

(56) References Cited

U.S. PATENT DOCUMENTS

| | | | |
|---|---|---|---|
| 6,658,485 B1 * | 12/2003 | Baber et al. ................. | 719/314 |
| 2004/0019652 A1 | 1/2004 | Freimuth et al. | |
| 2005/0129044 A1 * | 6/2005 | Katayama ................... | 370/412 |
| 2005/0163141 A1 * | 7/2005 | Katayama ................... | 370/412 |

FOREIGN PATENT DOCUMENTS

| | | |
|---|---|---|
| JP | 6-250983 | 9/1994 |
| JP | 11-346246 | 12/1999 |
| JP | 2003-333076 | 11/2003 |
| WO | WO 99/22306 | 5/1999 |
| WO | WO 01/35233 A1 | 5/2001 |

OTHER PUBLICATIONS

European Search Report dated May 31, 2007.

* cited by examiner

*Primary Examiner*—William Trost, IV
*Assistant Examiner*—Charles C Jiang
(74) *Attorney, Agent, or Firm*—McGinn IP Law Group, PLLC

(57) ABSTRACT

A TOE (TCP/IP Offload Engine) can transmit data to and receive data from a network without causing a plurality of high order processes to influence each other in a computer mounted by a plurality of processors, each of which is mounted by a plurality of cores. The TOE 101 generates a notification queue for each high order process. The TOE driver 102 holds information that tells which high order process corresponds to which socket and which notification queue. When transmitting data, the outgoing data are temporarily held on the transmission buffer queue 102-4 and the transmission buffer is added to the notification queue that corresponds to the relevant high order process after the transmission. When receiving data, the incoming data are stored in the reception buffer on the reception buffer queue 102-3 and the reception buffer is added to the notification queue that corresponds to the relevant high order process.

20 Claims, 10 Drawing Sheets

METHOD AND APPARATUS FOR TRANSMITTING DATA TO NETWORK AND METHOD AND APPARATUS FOR RECEIVING DATA FROM NETWORK

BACKGROUND OF THE INVENTION

1. Field of the Invention

This invention relates to a method and an apparatus for transmitting data to a network and a method and an apparatus for receiving data from a network. More particularly, the present invention relates to a method and an apparatus for transmitting data to a network and a method and an apparatus for receiving data from a network without causing a plurality of high order processes being executed in a plurality of processors operating simultaneously or a plurality of high order processes being executed in a plurality of cores operating simultaneously by one processor to influence each other.

2. Description of the Related Art

Conventionally, a computer is executing a plurality of processes apparently simultaneously by means of a single processor on a time-sharing basis. When each of a plurality of processes being executed simultaneously is adapted to transmit and receive IP (Internet Protocol) packets, the IP packets transmitted from the plurality of processes pass through the same queue and the IP packets that the plurality of processes will receive pass through the same queue.

Meanwhile, there is a trend that a plurality of processors are mounted on a single computer. Additionally, there is also a trend that a plurality of cores are mounted on a single processor.

However, when such a computer is operated in such a way that each of a plurality of processes that are executed simultaneously transmits and receives IP packets, the IP packets transmitted from the plurality of processes pass through the same queue in the computer and IP packets that the plurality of processes will receive pass through the same queue in the computer.

Particularly, the received IP packets are added to the same queue without discrimination among the processes. Therefore, if a process having a vast quantity of process causes a delay in taking out data from a queue, then the progress of the other processes using the same queue is also delayed. For example, such a situation becomes conspicuous when a NFS (network file system) and a CIFS (common internet file system) coexist in the same file server and the amount of the communication concentrates on one of the file systems. Further, such a situation becomes conspicuous when there exist a plurality of high order processes of NFS and the amount of the communication concentrates on one of the processes. Similarly, such a situation becomes conspicuous when there exist a plurality of high order processes of CIFS and the amount of the communication concentrates on one of the processes.

In a structure in which hardware having a TOE (TCP/IP Offload Engine) function of executing TCP/IP protocol processes in place of the CPU operating on the host is adapted, a single queue for temporarily holding transmission completion notification/receiving data is provided and a TOE driver and the firmware uses the single queue on the TOE. With this arrangement, the quantity of outgoing/incoming data that can be handled on a TOE card is limited. Additionally, when a high order process having a large quantity of outgoing/incoming data and a high order process having a small quantity of outgoing/incoming data operate simultaneously, the response time of the high order process having a small quantity of outgoing/incoming data will be delayed. This is caused because the processing operation of the process having a large quantity of outgoing/incoming data takes a long time and the processing operation of the process having a small quantity of outgoing/incoming data is forced to wait until the processing operation of the former process temporarily ends at a predetermined breakpoint.

SUMMARY OF THE INVENTION

In view of the above-identified circumstances, it is therefore the object of the present invention to provide a method and an apparatus for transmitting data to a network and a method and apparatus for receiving data from a network without causing a plurality of high order processes to influence each other in a computer on which a plurality of processors are mounted, or in a computer having a CPU on which a plurality of cores are mounted.

In the first aspect of the present invention, the above object is achieved by providing a method of transmitting data to a network comprising: a step in which a driver secures a transmission buffer from a storage apparatus for outgoing data, a step in which said driver stores the outgoing data received from a high order process in said transmission buffer, a step in which said driver adds the transmission buffer storing said outgoing data to a transmission buffer queue, a step in which an offload engine transmits the outgoing data stored in each transmission buffer on said transmission buffer queue to said network in the sequence of the transmission buffers on the transmission buffer queue upon detecting one or more transmission buffers on said transmission buffer queue, a step in which said offload engine adds each transmission buffer storing said transmitted outgoing data to one of notification queues corresponding to said high order process, referring to information on the corresponding relationship between each high order process and each notification queue, and a step in which said driver releases the transmission buffers to the storage apparatus on said notification queue.

A method as defined above may further comprise: a step in which said driver provides each notification queue corresponding to each high order process, and a step in which said driver provides information on the corresponding relationship between each high order process and each notification queue.

A method as defined above may further comprise: a step in which said driver, upon success of storing said outgoing data in said transmission buffer, notifies the success to said high order process.

A method as defined above may further comprise: a step in which said driver, upon detection of no entry to said notification queue corresponding to said transmission buffer added to said transmission buffer queue, notifies the no detection to the outside of the driver.

In a second aspect of the present invention, there is provided a method of receiving data from a network comprising: a step in which a driver secures a reception buffer from a storage apparatus for incoming data, a step in which said driver adds said reception buffer to a reception buffer queue, a step in which an offload engine stores the incoming data received from said network in said reception buffer on said reception buffer queue in the sequence of the reception buffers on the reception buffer queue, a step in which said offload engine adds each reception buffer storing said received incoming data to one of notification queues corresponding to said high order process, referring to information on the corresponding relationship between each high order process and each notification queue and a step in which said driver delivers the incoming data in the reception buffers on said notification queue to said high order process in the sequence of the reception buffers on the reception notification queue.

A method as defined above may further comprise: a step in which said driver provides notification queues corresponding to each high order process, and a step in which said driver provides information on the corresponding relationship between each high order process and each notification queue.

Thus, according to the present invention, since the offload engine adds each transmission buffer storing said transmitted outgoing data to the notification queue corresponding to said high order process, referring to information on the corresponding relationship between each high order process and each notification queue, it is possible to prevent a plurality of high order processes from influencing each other.

Similarly, according to the present invention, since the offload engine adds each reception buffer storing said received incoming data to the notification queue corresponding to said high order process, referring to information on the corresponding relationship between each high order process and each notification queue, it is possible to prevent a plurality of high order processes from influencing each other.

DETAILED DESCRIPTION OF THE PREFERRED EMBODIMENTS

Now, the present invention will be described in greater detail by referring to the accompanying drawings that illustrate preferred embodiments of the invention.

Host machines on which a plurality of CPUs are mounted are available in recent years. Similarly, CPUs on which a plurality of cores are mounted are available in recent years. It is possible to execute a plurality of processes simultaneously using such a host machine or such a CPU. According to the present invention, a plurality of queues are provided on a single TOE. Each of such a queues is used to notify that a completion of data transmission and used to temporally holding received data. We call this type of queue a notification queue. The number of notification queues is the same as the number of high order processes at the maximum. Therefore, the plurality of high order processes are executed their respective CPUs or their respective cores. Thus, the degree of multiple transmission is raised and the performance is improved. In addition, aforementioned disadvantage that a certain high order process impede the communication of another high order process is dissolved by providing notification queues, each of which corresponds to each of high order processes.

Now, the embodiments of the present invention will be described in greater detail by referring to the drawings.

First Embodiment

Figure 1:
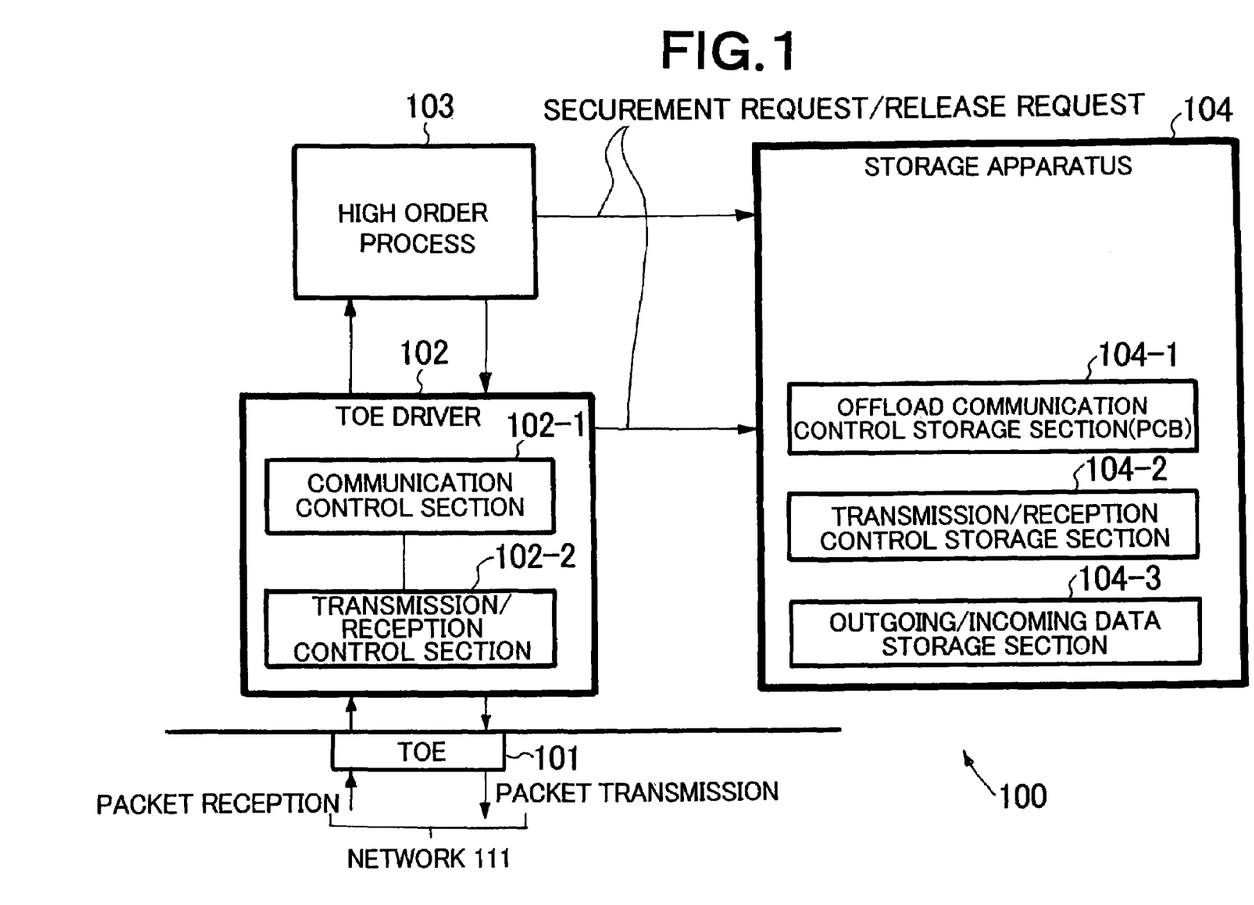
FIG. 1 is a schematic block diagram showing a structure of a computer according to an embodiment of the present invention.

Referring to FIG. 1, illustrating the first embodiment of the present invention, computer 100 is adapted to operate under the control of a program and comprises a TOE 101, a TOE driver (software) 102 for driving the TOE 101, a high order process (software) 103 that utilizes the TOE driver and a storage apparatus 104.

Figure 2:
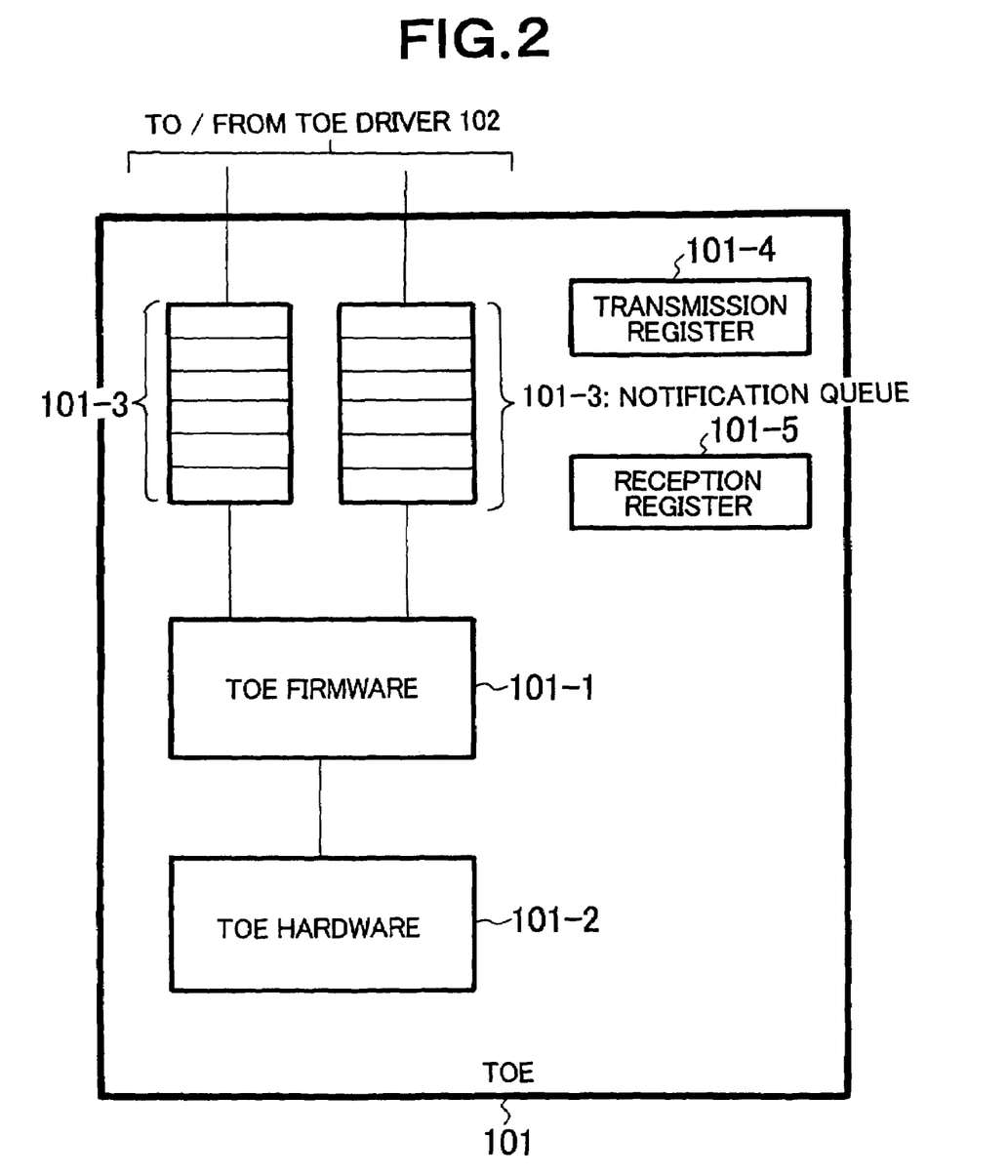
FIG. 2 is a schematic block diagram showing a structure of the TCP/IP offload engine of FIG. 1.

Referring now to FIG. 2, the TOE 101 comprises hardware (to be referred to as "TOE hardware" hereinafter) 101-2 and firmware (to be referred to as "TOE firmware" hereinafter) 101-1. The TOE firmware 101-2 controls the TOE hardware 101-2. Particularly, the TOE firmware 101-1 and the TOE hardware 101-2 transmit outgoing data in an outgoing/incoming data storage section 104-3 (see FIG. 3) onto a network and stores the incoming data received from the network in the outgoing/incoming data storage section 104-3. Further, they perform a process related to an IP.

The TOE 101 also comprises a plurality of notification queues 101-3. Each notification queue corresponds to each high order process 103. However, this does not mean to absolutely exclude a case where a plurality of processes correspond to a certain notification queue. The corresponding relationship is generated by the TOE driver 102 and stored in offload communication control storage section 104-1 (see FIG. 1).

Figure 3:
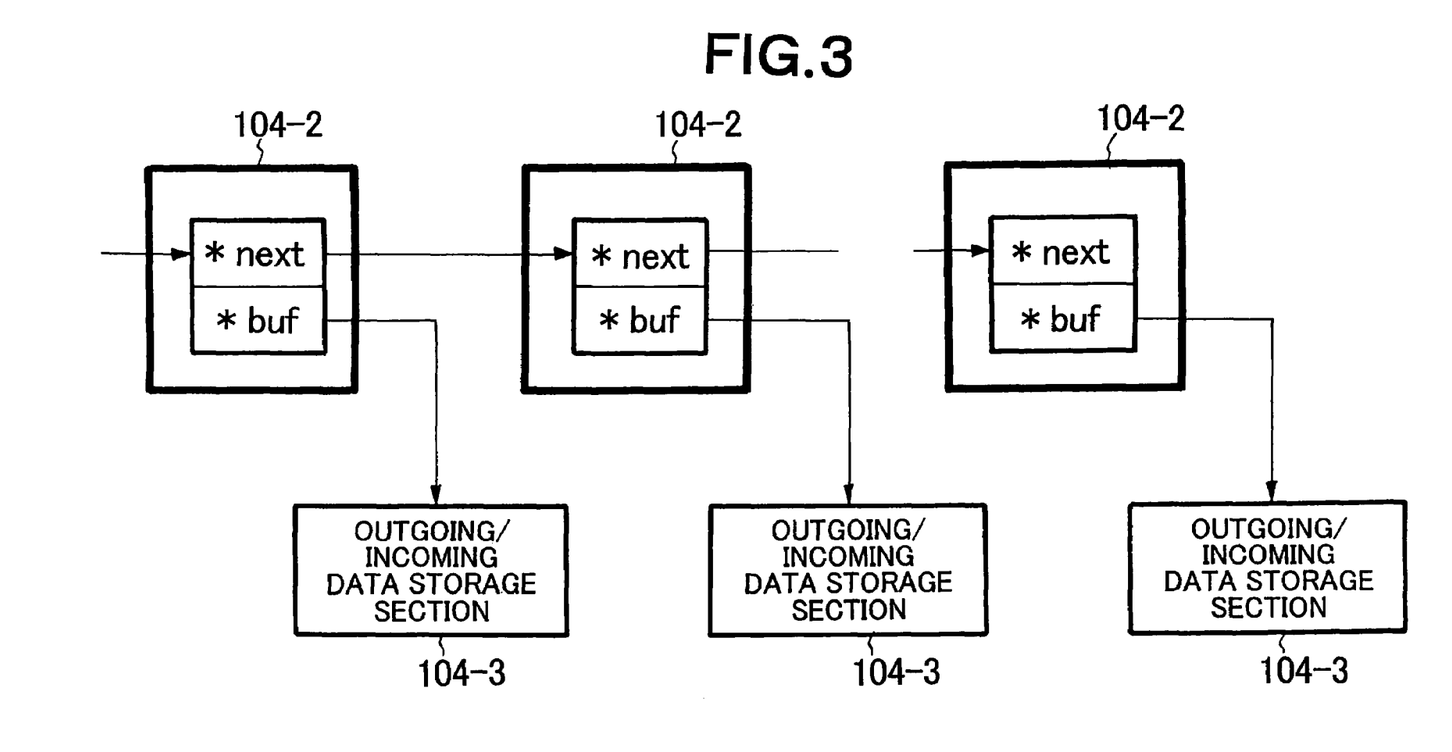
FIG. 3 is a schematic illustration of a notification queue, a transmission buffer queue and a reception buffer queue according the embodiment of the present invention.

Referring to FIG. 3, each entry of the notification queue 101-3 includes a transmission/reception control storage section 104-2 secured from the storage apparatus 104 and an incoming/outgoing data storage section 104-3 secured from the storage section 104. The transmission/reception control storage section 104-2 includes a pointer to the next entry (*next) and a pointer to the incoming/outgoing data storage section 104-3 (*buf). However, the method for forming a queue is not limited to a method of generating a one-way list.

Figure 4:
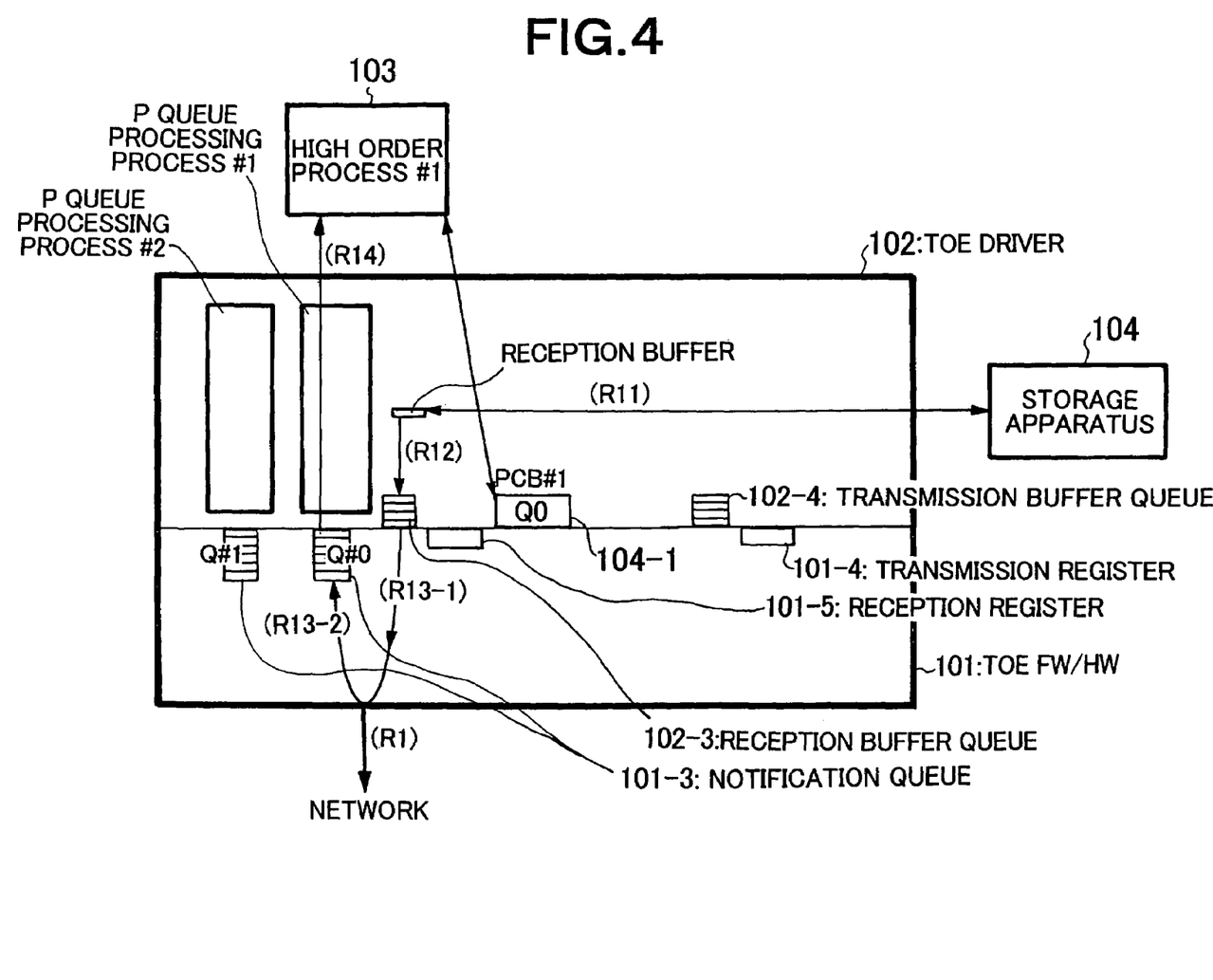
FIG. 4 is a schematic diagram showing the operation of the computer according to the embodiment of the present invention, when high order process #1 of the computer receives a packet.

The TOE driver 102 has a transmission buffer queue 102-4 (see FIG. 4) and a reception buffer queue 102-3 (see FIG. 4). These buffers are physically arranged in the storage apparatus 104. Both the transmission buffer queue 102-4 and the reception buffer queue 102-3 have a structure as shown in FIG. 3, similarly to the notification queue 101-3.

The transmission buffer that constitutes each entry of the transmission buffer queue 102-4 is adapted to temporarily hold the outgoing data received from the high order process until the TOE 101 transmits the data. After the completion of the data transmission, the transmission buffer is deleted from the transmission buffer queue 102-4 and added to the notification queue 101-3 that corresponds to the high order process. This means that the transmission buffer is transferred from the transmission buffer queue 102-4 to the notification queue

101-3. The entries added to the notification queue 101-3 is disposed sequentially from the leading one and the region occupied by them is returned to the storage apparatus 104. The TOE driver 102 checks the entries of the notification queue 101-3 from the leading one in order to examine whether the data has been transmitted successfully according to the request made by the high order process. It may be so arranged that, if the data are not transmitted successfully according to the request, then the transmission failure is notified to the relevant high order process or the operating system.

Additionally, the TOE driver 102 notifies whether or not the transmission buffer storing the outgoing data received from the high order process is present on the transmission buffer queue 102-4 to the TOE 101 by way of the transmission register 101-4 (see FIG. 4). The TOE 101 checks the transmission register 101-4 and, if it recognizes that the outgoing data are there, it transmits the data and then moves the transmission buffer from the transmission buffer queue 102-4 to the notification queue 101-3. The notification queue 101-3 to which the transmission buffer is moved corresponds to the related high order process. Since the corresponding relationship is stored in the offload communication control storage section 104-1, the TOE firmware 101-1 can locate the notification queue 101-3 to which the transmission buffer is moved by referring to it.

Incidentally, characteristics of the present invention is to provide a plurality of notification queues. Ideally, one notification queue corresponds to one high order process, however, one notification queue may correspond to a plurality of high order processes, in regard to hardware resource shortage for the queues and the like of the TOE 101.

The reception buffer that constitutes each entry of the reception buffer queue 102-3 is adapted to temporarily hold the received data. The reception buffer is prepared and added to the reception buffer queue 102-3 before the reception of the data. When the TOE 101 actually receives the data, the received data are stored in one or more leading reception buffers on the reception buffer queue 102-3. Thereafter, the TOE firmware 101-1 moves the one or more reception buffers storing the received data from the reception buffer queue 102-3 to the notification queue 101-3. The notification queue 101-3 to which the reception buffers are moved correspond to the high order process. Since the corresponding relationship is stored in the offload communication control storage section 104-1, the TOE firmware 101-1 can find out the notification queue 101-3 to which the reception buffers should be moved by referring to it.

Now, returning to FIG. 1, the TOE driver 102 links the TOE 101 and the high order process 103 for the purpose of exchanging data. The TOE driver 102 includes a communication control section 102-1 and a transmission/reception control section 102-2. The communication control section 102-1 controls the information necessary for the TOE 101 for offload communications. The transmission/reception control section 102-2 has an offload transmission function of transmitting a transmission request from the high order process 103 to the TOE firmware 101-1 and an offload reception function of receiving the data received from the network 111 and offload-processed by the TOE firmware 101-1.

The transmission/reception control section 102-2 executes a notification queue monitoring process. In the notification queue monitoring process treat the transmission buffer or the reception buffer which is received from the TOE firmware 101-2 through the notification queue 101-3.

The communication control section 102-1 utilizes the offload communication control storage section 104-1 that stores information for controlling actual offload communications. The offload communication control storage section 104-1 stores the corresponding relationship between information for identifying the high order process and information for identifying the notification queue.

The high order process 103 is a program that utilizes offload communications. It exchanges transmission requests and reception notifications between the TOE driver 102.

The storage apparatus 104 has a storage region necessary for transmissions/receptions. When the storage apparatus 104 receives a request for securing a storage region from the TOE driver 102 or the high order process 103, the storage region is secured in the storage apparatus 104 and the pointer pointing to the storage region is delivered to the TOE driver 102, the TOE 101 or the high order process 103. When the storage apparatus 104 receives a request for releasing the storage region from the TOE driver 102 or the high order process 103, it releases the existing storage region.

Now, the operation of the first embodiment will be described in detail by referring to FIGS. 1, 5, 6 and 7.

Firstly, preparation of a socket that utilizes the offload feature will be described by referring to FIGS. 1 and 5.

To begin with, the high order process 103 requests the TOE driver 102 to prepare a socket (Step S001).

Then, the TOE driver 102 collects information (IP address, port number and so on) necessary for offload communication at the TOE 101 from the packets and socket received from the high order process 103. At this time, it further selects the number #n of the notification queue 101-3 that it wants to be notified of from the TOE firmware 101-1 at the time of completion of transmission and at the time of notification of reception (Step S002). For example, the number #n of the notification queue 101-3 may be selected according to the source port number received from the high order process. Since the port number held by a server type process in the TCP/IP is determined in advance, the number #n of the notification queue 101-3 that each high order process 103 uses is unequivocally determined when the number #n of the notification queue is selected in this way. Alternatively, only part of all the bits used to express the port number may be extracted and used as number #n of the notification queue 101-3. If the number of high order processes is equal to the number of the notification queues, then it is preferable that different high order processes uses different number of the notification queue. However, if the number of high order processes is more than the number of the notification queues, then it is inevitable that some different high order processes uses a common number of the notification queue. Even in the latter case, the disadvantage of the conventional technology is solved to some degree. The point is that in the conventional technology, N high order processes share a single notification queue, while in the present invention, N high order processes use their respective notification queues at the best and N high order processes use M (more than one and less than N) notification queues even in worse circumstances.

Then, a new communication control storage section 104-1 is generated. Then, the above information (information necessary for offload communication at the TOE 101 (IP address, port number and so on), the number #n of the notification queue 101-3 and the information for identifying the high order process and so on) is stored in the generated offload communication control storage section 104-1 (Step S003).

Finally, the pointer pointing to the offload communication control storage section 104-1 is notified to the TOE firmware 101-1 (S004). As a result, the TOE firmware 101-1 can find out the corresponding relationship among three members, i.e., the high order process, the notification queue 101-3 and the socket information of the IP packets.

Figure 6:
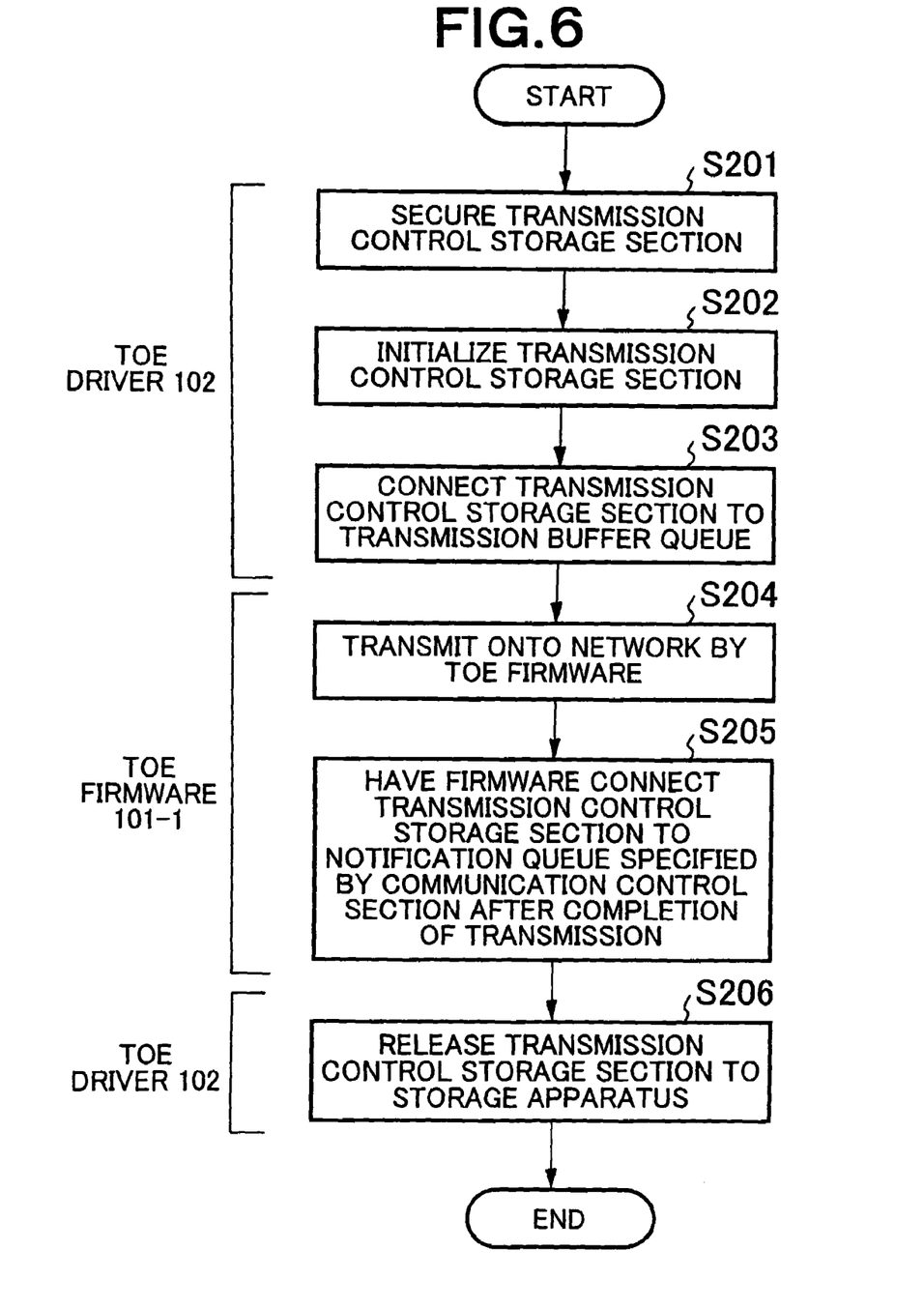
FIG. 6 is a flowchart showing the operation of offload transmission process executed by the computer according to the present invention.

Now, the process of offload transmission and the process of completion of transmission will be described by referring to FIGS. 1 and 6.

A transmission process is started when the high order process 103 issues a transmission request to the TOE driver 102.

Then, the TOE driver 102 secures a transmission control storage section 104-2 in the storage apparatus 104 in order to store the outgoing data in the storage section 104-2 in the form which can be interpreted by the TOE firmware 101-1 (Step S201). The storage section 104-2 constitutes a part of the transmission buffer. Note that the transmission/reception control storage section 104-2 is referred to as a transmission control storage section at the time of data transmission and referred to as a reception control storage section at the time of data reception. Similarly, the outgoing/incoming data storage section 104-3 is referred to as an outgoing data storage section at the time of data transmission and referred to as an incoming data storage section at the time of data reception.

Then, information necessary for data transmission such as the pointer pointing to the outgoing/incoming data storage section 104-3 storing the data to be actually transmitted is stored in the transmission/reception control storage section 104-2 (Step S202). Note that the outgoing/incoming data storage section 104-3 is already generated and the outgoing data are already stored in Step S201.

Thereafter, the new transmission/reception control storage section 104-2 is connected to the existing transmission/reception control storage section 104-2 (Step S203). This corresponds to the addition of a transmission buffer to the transmission buffer queue. Then, what is stored in the transmission register 101-4 at the TOE 101 (see FIG. 4) is changed in order to notify the TOE 101 of the fact that the new transmission/reception control storage section 104-2 is connected. For example, if the transmission register 101-4 shows the number of entries found on the transmission buffer queue 102-4, the number is incremented by one. If the transmission register 101-4 shows if one or more entries are found on the transmission buffer queue 102-4 or not and there is no entry there so far, the value of the transmission register 101-4 is changed to the value that indicates the existence of an entry. If there is already an entry there, the value of the transmission register 101-4 that indicates the existence of an entry is maintained.

The TOE firmware 101-1 recognizes the arrival of the transmission/reception buffer storing outgoing data and subsequently executes a transmission process. As a result, the outgoing data flows onto the network (Step S204). At this time, the socket information stored in the offload communication control storage section 104-1 is utilized.

When the transmission of data is over, the TOE firmware 101-1 adds a transmission buffer 104-2, 204-3 to the entries already existing on the notification queue 101-3 in order to notify the TOE driver 102 of the fact that the transmission is completed. The notification queue 101-3 to which the new entry is added is the one specified by the offload communication control section 104-1 (Step S205).

As the TOE driver 102 that monitors the notification queue 101-3 (notification queue monitoring process) recognizes that the new entry is connected to the notification queue 101-3, it deletes it from the notification queue 101-3 and releases the transmission buffer to the storage region.

Figure 7:
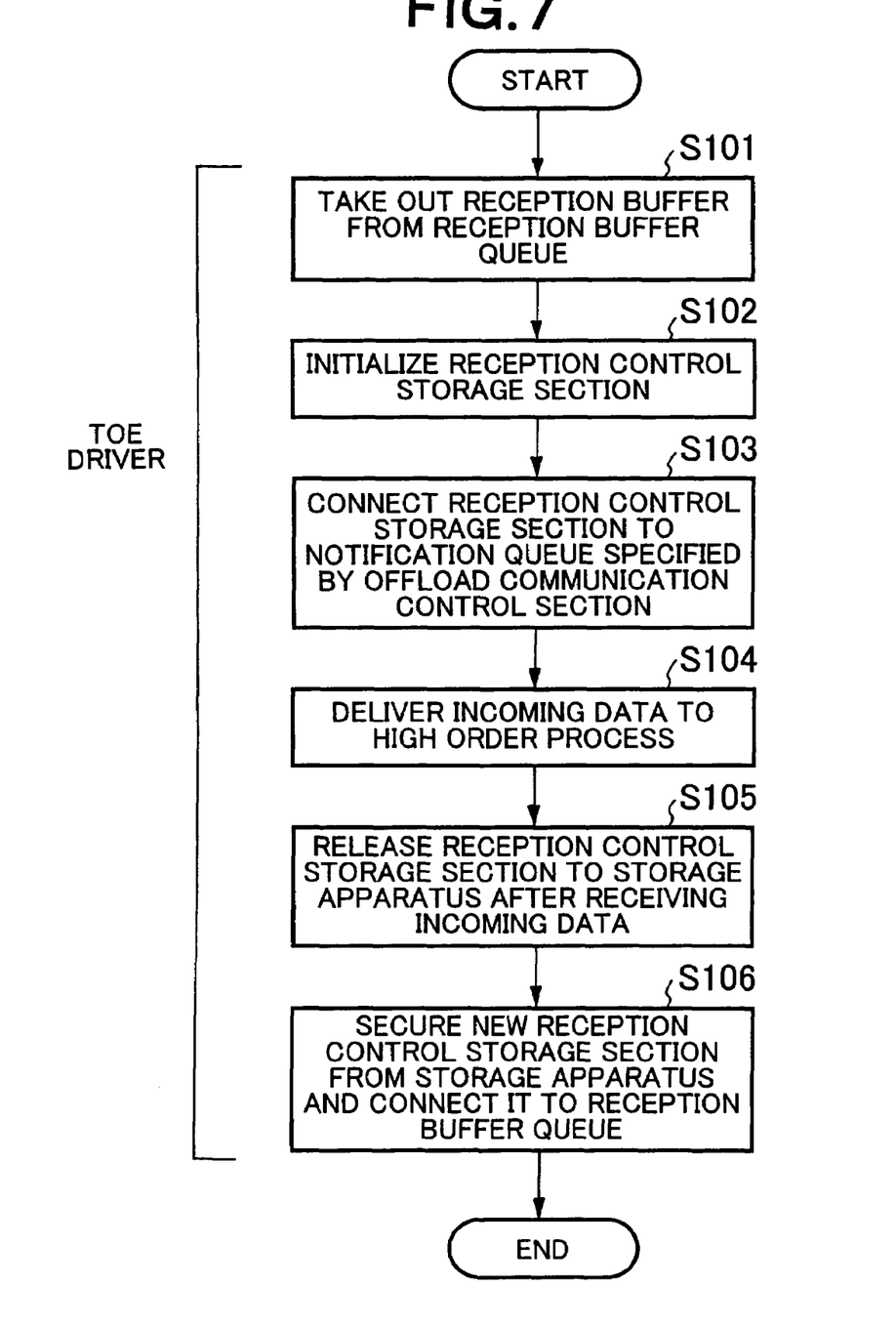
FIG. 7 is a flowchart showing the operation of offload reception process executed by the computer according to the present invention.

Now, the offload reception process will be described by referring to FIGS. 1 and 7.

When the TOE 101 receives incoming data from the network, it takes out a reception buffer from the reception buffer queue 102-3 (see FIG. 4) (Step S101) and stores the received data in the reception buffer it takes out (Step S102).

After storing the received data in the reception buffer, the TOE firmware 101-1 adds an entry that includes the reception buffer to the notification queue in order to notify the TOE driver 102 of the fact that it received the data. The notification queue 101-3 to which the new entry is added is the one specified by the offload communication control storage section 104-1 (Step S103).

The notification queue monitoring process (performed by the transmission/reception control section 102-2) that has monitored the notification queue 101-3 confirms that a new entry including the transmission/reception buffer is newly connected to the notification queue 101-3. Then, the notification queue monitoring process delivers reception data in the reception buffer to the high order process.

As the received data in the reception buffer are successfully delivered to high order process 103, the used transmission/reception control storage section 104-2 is released to the storage apparatus (Step S105).

Additionally, the TOE driver 102 secures a new reception buffer (a reception control storage section 104-2 and an incoming data storage section 104-3) from the storage region in order to make itself ready for receiving new data and connects the new reception buffer having the above described configuration to the reception buffer queue 102-3. Then, the TOE driver 102 notifies the TOE 102 of the fact that the new reception buffer is added to the reception buffer queue 102-3 by way of the reception register 101-5 (Step S106).

Now, a series of operations designed by taking a server type high order process into consideration will be described as an example by referring to FIGS. 4, 8 and 9. In other words, the computer is assumed to be a file server that utilizes an NFS or a CIFS. The server receives a request for downloading or uploading a file (receives IP packets) as shown in FIG. 4 and after negotiation, downloads the file in response to the request (transmits IP packets) as shown in FIG. 8 or uploads the file in response to the request (receives IP packets) as shown in FIG. 9.

Figure 8:
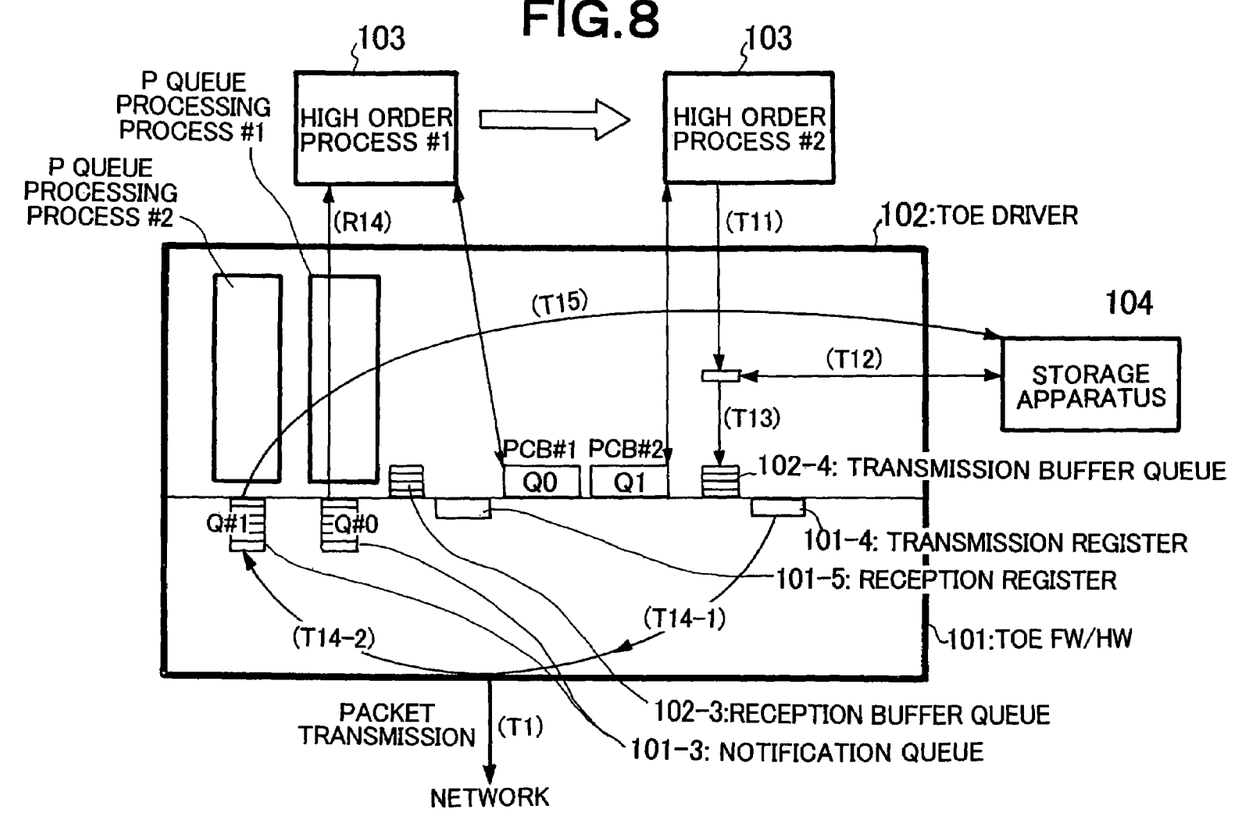
FIG. 8 is a flowchart showing the operation of the computer according to the present invention when high order process #2 transmits packets.
Figure 9:
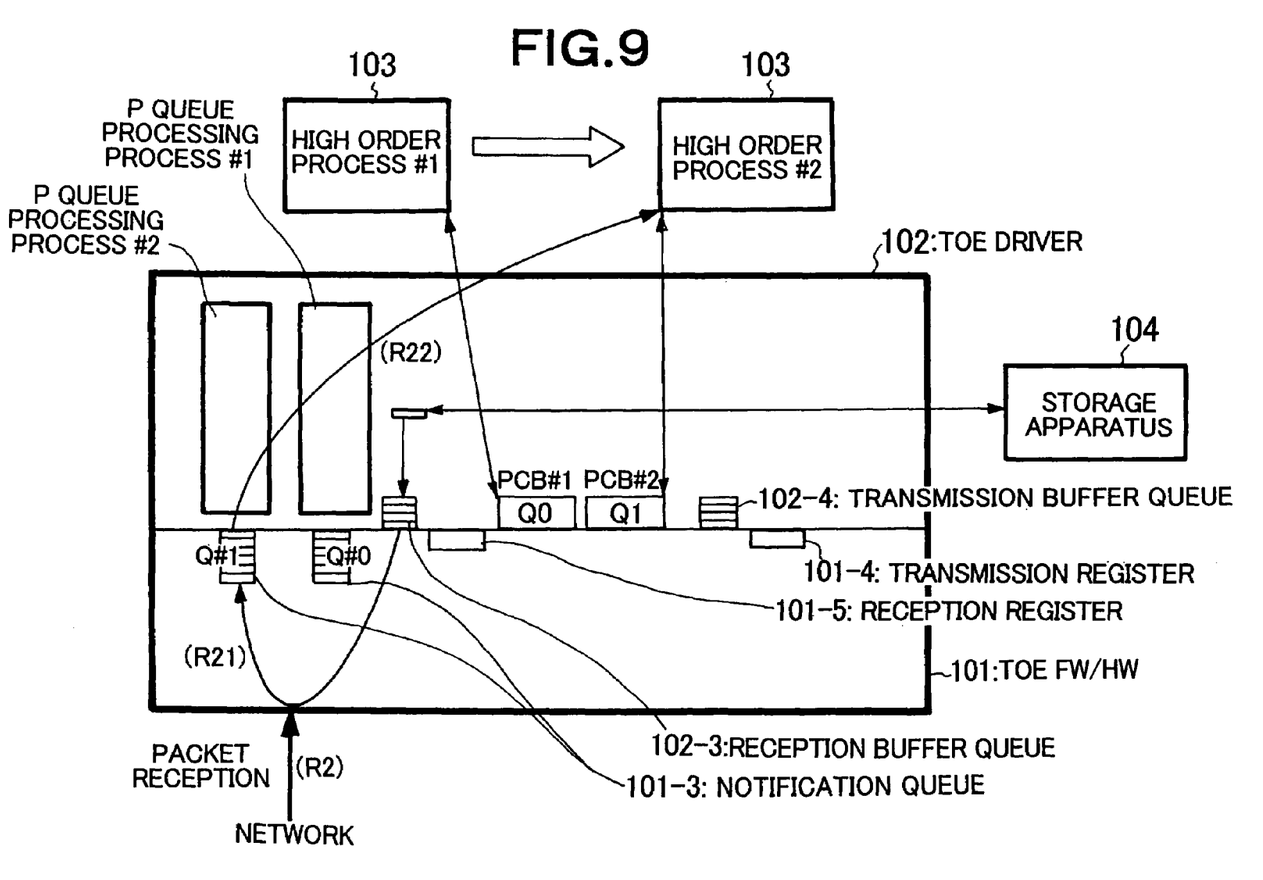
FIG. 9 is a flowchart showing the operation of the computer according to the present invention when high order process #2 receives packets.

In FIGS. 4, 8 and 9 describes the storage sections (reception buffer, transmission buffer, notification queue and so forth) which the TOE driver 102 requires the storage apparatus 104 and which is secured as a result of the request inside of the TOE driver 102 and the inside of the TOE 101. However, physically, these storage sections are located inside of the storage apparatus 104.

Referring to FIG. 4, it is assumed that a request is issued from a client on the network (R1), asking to download or upload a file. The request arrives in the form of IP packets.

Upon receiving the incoming data, the TOE 101 takes out the leading reception buffer from the reception buffer queue 102-3 (R13). Note that the TOE 101 secures a reception buffer from the storage apparatus 104 and prepares a reception buffer queue 102-3 in advance at the time of the initialization of the driver (R11, R12).

The TOE firmware 101-1 stores the received data in the incoming data storage section 104-3 of the reception buffer and stores the control information necessary for the reception in the reception control storage section 104-2 (R13-1). Then, the TOE firmware 101-1 looks into the offload communication control storage section 104-1 that corresponds to the high order process 103 and checks the notification queue 101-3 to which the received data stored in the incoming data storage section 104-3 of the reception buffer should be linked. In this instance, since the notification queue in question is found to be the notification queue #0 as a result of looking into the offload communication control storage section 104-1 (PCB

1), the TOE firmware 101-1 links the reception control storage section 104-2 of the reception buffer to the notification queue #0 (R13-2).

As it is find out that the reception buffer is linked to the notification queue #0 in the CQ monitoring process #1 by the transmission/reception control section 102-2 that is monitoring the notification queue #0, it delivers the received data to the high order process #1 (R14). Since the reception buffer that is used for the reception is no longer necessary, it is released to the storage apparatus 104.

The high order process #1 analyzes the received data and generates another process that operates for communication as high order process #2 (see FIG. 8 or 9).

Thereafter, the high order process #1 has the high order process #2 perform subsequent communications and dedicates itself to reception of requests.

In the instance of FIG. 8, the high order process #2 transmits IP packets.

Referring to FIG. 8, the high order process #2 prepares a socket for offload communication. At this time, the high order process #2 may well utilize the notification queue #1 so that it assigns the notification queue #1 to the offload communication control storage section 104-1 PCB #2. After preparing the socket necessary for communication, the high order process #2 issues a transmission request to the TOE driver 102 (T11 in FIG. 8).

Upon receiving the transmission request, the TOE driver 102 secures the transmission control storage section 104-2 from the storage apparatus 104 (T12). Then, the TOE driver 102 prepares control data that the TOE firmware 101-1 can understand and stores them in the transmission control storage section 104-2. Subsequently, it connects the transmission control storage section 104-2 to the transmission buffer queue 102-4 (T13). Note that the TOE driver 102 already receives outgoing data from the high order process #2 and stores them in the outgoing data storage section 104-3 indicated by the pointer (*buf) of the transmission control storage section 104-2.

After adding the transmission control storage section 104-2 to the transmission buffer queue 102-4, the TOE driver 102 notifies the addition to the TOE firmware 101-1 by way of the transmission register 101-4. Then, the TOE firmware 101-1 takes out the data to be transmitted from the transmission buffer queue 102-4 and transmits the packets of the data onto the network (T14-1).

Thereafter, the TOE firmware 101-1 links the transmission buffer to the notification queue 101-3. At this time, it looks into the offload communication control storage section 104-1 (PCB #2) and checks the notification queue to which the transmission buffer is to be connected (T14-2). In the above described instance, the TOE firmware 101-1 links the transmission buffer to the notification queue #2. As the monitoring process #2 that is monitoring the notification queue #2 detects that the transmission buffer is linked to the notification queue #2, it releases the region that has been used to the storage region.

In the instance of FIG. 9, the high order process #2 receives IP packets. The instance illustrated in FIG. 9 is similar to the instance of FIG. 4, although they differ from each other in a manner as described below.

The offload communication control storage section 104-1 (PCB #1) and the notification queue 103-1 (Q #0) correspond to the high order process #1 in the instance of FIG. 4, whereas the offload communication control storage section 104-1 (PCB #2) and the notification queue 103-1 (Q #1) correspond to the high order process #2 in the instance of FIG. 9.

Thus, notification queues can be used separately and appropriately on purpose in a manner as described above.

Next, advantages of the first embodiment will be described below.

Since a plurality of notification queues are provided so as to be used for respective high order processes in the first embodiment, the TOE firmware 101-1 can execute parallel notification processes of notifying the high order processes in parallel.

Since the notification queues to be used are selected according to the port number in the first embodiment, the communication performance can be secured in a case as described below. Namely, an NFS and a CIFS are provided for a high order process and the NFS is used for the notification queue Q #1 while the CIFS is used for the notification queue #2. While the NFS may be used very frequently, this mode of operation can be utilized when it is desirable to secure the communication feature of the CIFS. The notification queues are assigned separately between the NFS and the CIFS so that the NFS and the CIFS do not influence each other for communication and hence the quality of communication can be ensured for both of them.

Second Embodiment

Now, the second embodiment of the present invention will be described by referring to the related drawings.

The second embodiment has a configuration same as the first embodiment. The two embodiments differ from each other in term of the operation of preparing a socket. However, the computer 100, the TOE 101, the TOE driver 102, the high order process 103 and the storage apparatus 104 of the second embodiment operate same as their counterparts of the first embodiment.

Now, the operation of preparing a socket of the second embodiment will be described by referring to FIG. 10.

In an ordinary process of preparing a socket (Step S301), the TOE driver 102 collects information necessary for offload communication at the TOE 101 (IP address, port number and so on) from the packets and the socket. At this time, it further selects the number of the notification queue of which it wants to be notified from the TOE firmware 101-1 at the time of completion of transmission and at the time of notification of reception (Step S302). In the second embodiment, a value is computationally determined for the number of the notification queue by using a computation method that randomly provides a value for the number of the notification queue on the basis of the IP address and the port number of the communication partner (e.g., a computation method utilizing a hash function) and the determined number is used for the number of the notification queue. With this arrangement, the numbers that are used for notification queues can be distributed randomly and hence the processing for notification queues can be made infinitely close to parallel processing.

With this arrangement, it is not possible to obtain the advantage of the present invention that high order processes do not influence each other when different high order processes happen to utilize the same queue by chance. However, even in that case, it is possible to make the high order processes operate without failure, because the TOE driver distinguishes each high order process using an IP address and a port number, and delivers data from each buffer in the same notification queue to an appropriate high order process.

Figure 5:
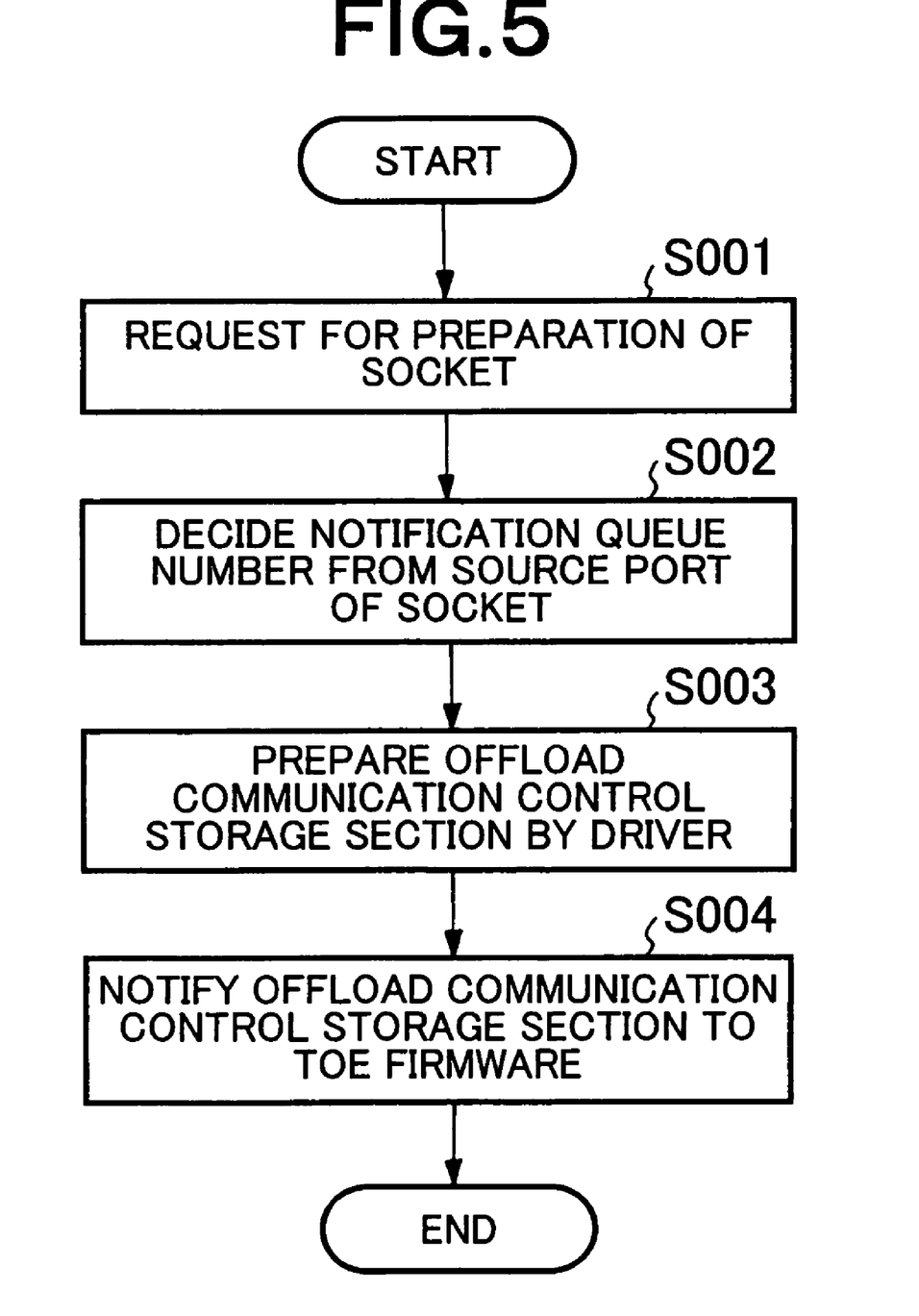
FIG. 5 is a flowchart showing the operation of preparing a socket according to a first embodiment of the present invention, executed by the computer according to the present invention.
Figure 10:
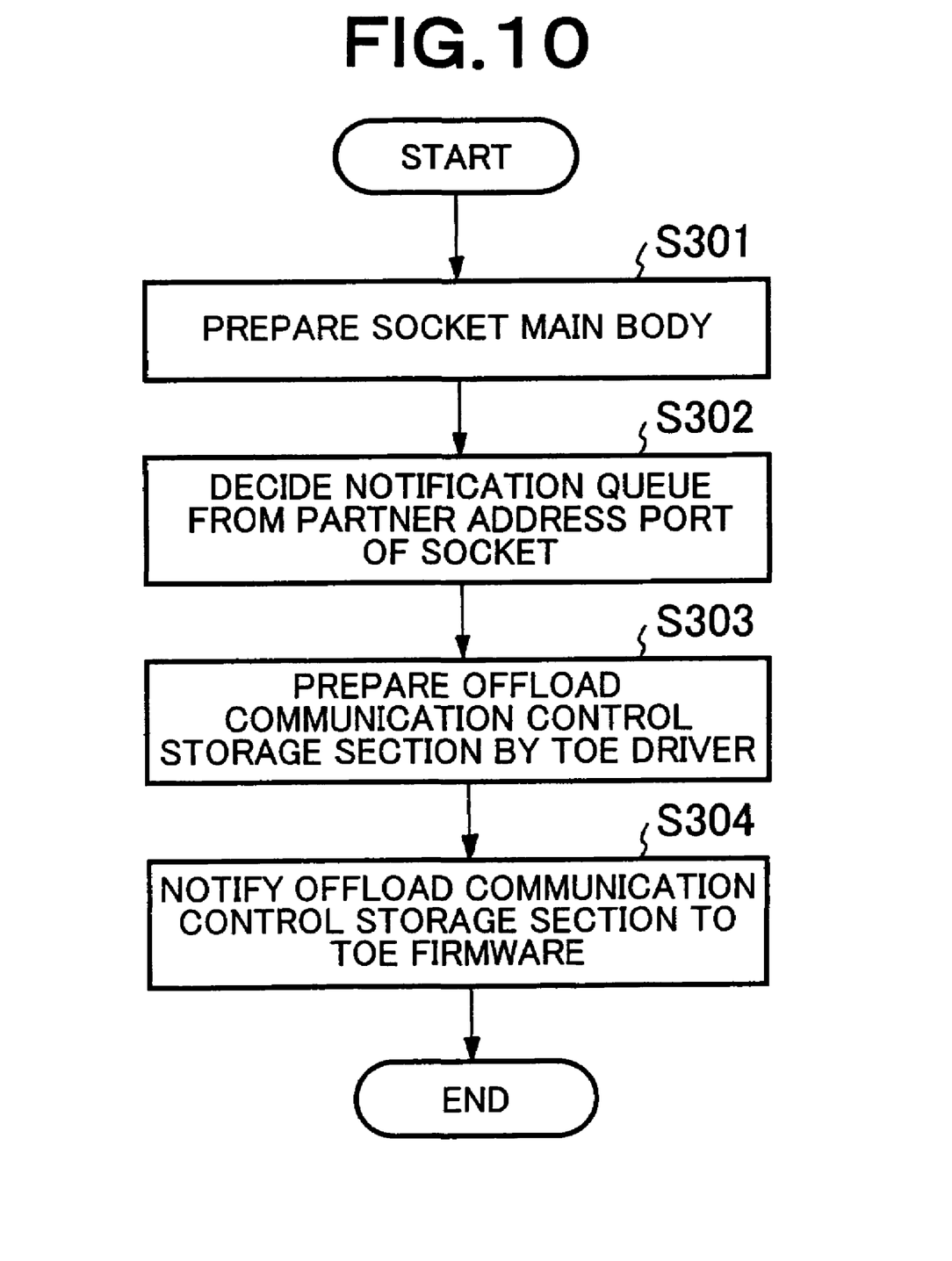
FIG. 10 is a flowchart showing the operation of preparing a socket according to a second embodiment of the present invention, executed by the computer according to the present invention.

Since Steps S303 and S304 in FIG. 10 are respectively same as Step S003 and S004 in FIG. 5, they will not be described here any further.

Next, advantage of the second embodiment will be described below.

The number of the notification queue to be used is selected in a manner infinitely close to random selection in the second embodiment so that it is possible to execute transmission/reception processes in parallel. Therefore, it can efficiently adapt itself to simultaneous executions of a plurality of processes on the host machines with a plurality of CPUs and on the CPUs with a plurality of cores.

What is claimed is:

1. A method of transmitting data to a network, said method comprising:
   a step in which a driver secures a transmission buffer from a storage apparatus for outgoing data;
   a step in which said driver stores outgoing data received from a high order process in said transmission buffer;
   a step in which said driver adds the transmission buffer storing said outgoing data to a transmission buffer queue;
   a step in which an offload engine transmits the outgoing data stored in each transmission buffer on said transmission buffer queue to said network in a sequence of the transmission buffers on the transmission buffer queue upon detecting one or more transmission buffers on said transmission buffer queue;
   a step in which said offload engine adds each transmission buffer which had stored said transmitted outgoing data to one of a plurality of notification queues, wherein said one of said plurality of notification queues corresponds to said high order process had transmitted said outgoing data to said driver, referring to information on a corresponding relationship between each high order process and each notification queue; and
   a step in which said driver releases the transmission buffers on said notification queue.

2. The method according to claim 1, further comprising:
   a step in which said driver provides each notification queue corresponding to each high order process; and
   a step in which said driver provides said information on the corresponding relationship between each high order process and each notification queue.

3. The method according to claim 1, further comprising:
   a step in which said driver, upon a success of storing said outgoing data in said transmission buffer, notifies the success to said corresponding high order process.

4. The method according to claim 1, further comprising:
   a step in which said driver, upon a detection of no entry to said notification queue corresponding to said transmission buffer added to said transmission buffer queue, notifies the no entry detection to outside of the driver.

5. The method according to claim 4, wherein said no entry detection is notified to the corresponding high order process.

6. The method according to claim 4, wherein said no entry detection is notified to an associated operating system.

7. The method according to claim 1, wherein a number of said notification queues is the same as a maximum number of said high order processes.

8. A method of receiving data from a network, said method comprising:
   a step in which a driver secures a reception buffer from a storage apparatus for incoming data;
   a step in which said driver adds said reception buffer to a reception buffer queue;
   a step in which an offload engine stores the incoming data received from said network in said reception buffer on said reception buffer queue in a sequence of the reception buffers on the reception buffer queue;
   a step in which said offload engine adds each reception buffer storing said received incoming data to one of a plurality of notification queues, wherein said one of said plurality of notification queues corresponds to a high order process which is designated by said incoming data, referring to information on a corresponding relationship between each high order process and each notification queue; and
   a step in which said driver delivers the incoming data in the reception buffers on said notification queue to said high order process in a sequence of the reception buffers on the reception notification queue.

9. The method according to claim 8 further comprising:
   a step in which said driver provides a notification queue corresponding to each high order process; and
   a step in which said driver provides said information on the corresponding relationship between each high order process and each notification queue.

10. The method according to claim 8, wherein a number of said notification queues is the same as a maximum number of said high order processes.

11. An apparatus for transmitting data to a network, said apparatus comprising:
    a unit for securing a transmission buffer from a storage apparatus for outgoing data;
    a unit for storing the outgoing data received from a high order process in said transmission buffer;
    a unit for adding the transmission buffer storing said outgoing data to a transmission buffer queue;
    a unit for transmitting the outgoing data stored in each transmission buffer on said transmission buffer queue to said network in a sequence of the transmission buffers on the transmission buffer queue upon detecting one or more transmission buffers on said transmission buffer queue;
    a unit for adding each transmission buffer which had stored said transmitted outgoing data to one of a plurality of notification queues, wherein said one of said plurality of notification queues corresponds to said high order process which had transmitted said outgoing data, referring to information on a corresponding relationship between each high order process and each notification queue; and
    a unit for releasing the transmission buffers on said notification queue.

12. The apparatus according to claim 11, further comprising:
    a unit for providing each notification queue corresponding to each high order process; and
    a unit for providing information on the corresponding relationship between each high order process and each notification queue.

13. The apparatus according to claim 11, further comprising:
    a unit for notifying, upon a success of storing said outgoing data in said transmission buffer, the success to said corresponding high order process.

14. The apparatus according to claim 11, further comprising:
    a unit for notifying, upon a detection of a no entry to said notification queue corresponding to said transmission buffer added to said transmission buffer queue, the no entry detection to outside of the driver.

15. The apparatus according to claim 14, wherein said no entry detection is notified to the corresponding high order process.

16. The apparatus according to claim 14, wherein said no entry detection is notified to an associated operating system.

17. The apparatus according to claim 11, wherein a number of said notification queues is the same as a maximum number of said high order processes.

18. An apparatus for receiving data from a network, said apparatus comprising:
- a unit for securing a reception buffer from a storage apparatus for incoming data;
- a unit for adding said reception buffer to a reception buffer queue;
- a unit for storing the incoming data received from said network in said reception buffer on said reception buffer queue in a sequence of the reception buffers on the reception buffer queue;
- a unit for adding each reception buffer storing said received incoming data to one of a plurality of notification queues, wherein said one of said plurality of notification queues corresponds to said high order process, which is designated by said incoming data, referring to information on a corresponding relationship between each high order process and each notification queue; and
- a unit for delivering the incoming data in the reception buffers on said notification queue to said high order process in a sequence of the reception buffers on the reception notification queue.

19. The apparatus according to claim 18, further comprising:
- a unit for providing a notification queue corresponding to each high order process; and
- a unit for providing information on the corresponding relationship between each high order process and each notification queue.

20. The apparatus according to claim 18, wherein a number of said notification queues is the same as a maximum number of said high order processes.

* * * * *